March 31, 1942. R. A. H. P. CHAPELLE 2,278,400
FRUIT STONING MACHINE
Filed Nov. 28, 1938
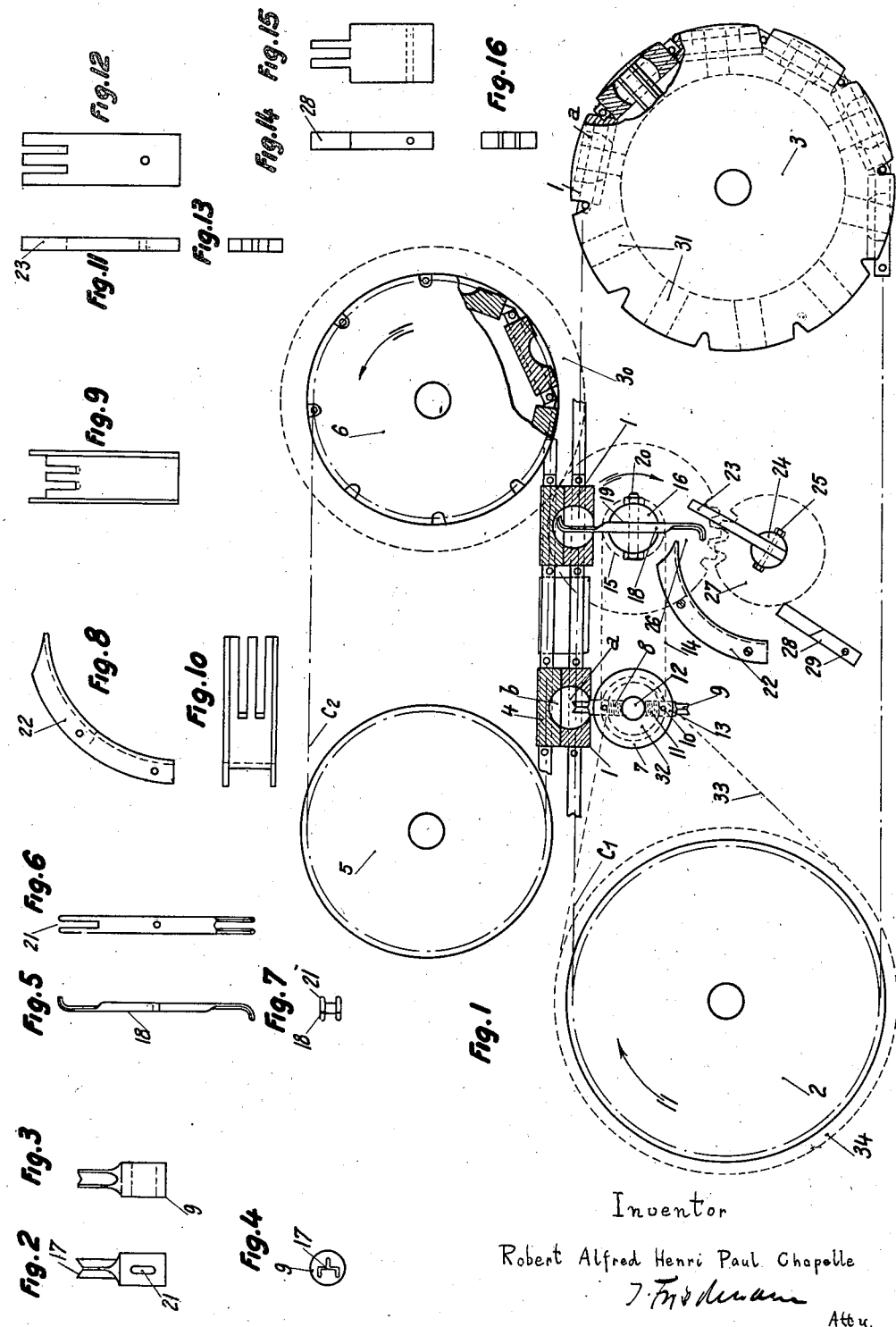
Inventor
Robert Alfred Henri Paul Chapelle
J. Friedman
Atty.

Patented Mar. 31, 1942

2,278,400

UNITED STATES PATENT OFFICE 2,278,400

FRUIT STONING MACHINE

Robert Alfred Henri Paul Chapelle, Beaucaire, France

Application November 28, 1938, Serial No. 242,753
In France November 30, 1937

4 Claims. (Cl. 146—18)

This invention relates to a machine for stoning fruit, especially cherries, this machine being particularly characterized by the fact that all its working parts have only one simple and continuous rotary motion.

The features and advantages of the machine are set forth in the following description with reference to the attached drawing in which:

Fig. 1 is a general diagrammatic elevation view of the machine,

Figs. 2, 3, and 4 are an elevation, a profile, and a plan views, respectively, of the tool intended to loosen the stones to be removed, Figs. 5, 6 and 7 are similar views to those of Figs. 2 to 4 showing the tool for removing the stones, Figs. 8, 9 and 10 are similar views to those of Figs. 2 to 4 showing the part which receives the stones from the tool in Figs. 5 to 7, Figs. 11, 12, and 13 are similar views to those of Figs. 2 to 4 showing the part which co-operates with that in Figs. 8 to 10, Figs. 14, 15 and 16 are views similar to those of Figs. 2 to 4, showing an attachment for cleaning the part shown in Figs. 11 to 13.

The machine shown, whose frame is supposed to be removed, has, in general, a device for receiving the fruit to be stoned, and various tools acting in succession for the purpose of loosening the stone, removing the stone, and releasing the removing tool from the stone.

The forementioned device is formed by a double chain $C^1$ to which are fixed parts 1 having a hole in the lower portion of a cavity $a$ of the shape of the fruit to be stoned. This chain $C^1$ is fitted on two pinions 2 and 3 which, by their rotation, impart to it a continuous advancing motion of a regular speed. This motion is produced by the rotation of pinion 2 integral with a toothed wheel 34 which is driven by a chain 33, coming from a pinion 32, keyed to a shaft 12. The fruit to be stoned, inserted in cavities $a$ of parts 1, either by hand or by a mechanical device automatically filling the said cavities, is covered and held in them by means of a part 4. This latter part has a small cavity $b$ whose shape completes that of cavity $a$ and, covering itself with it, limits the volume of fruit to be stoned. Parts 4 are also fitted on a double chain $C^2$, which is supported by pinions 5 and 6 and which, by rotation of pinion 6 driven by toothed wheel 30, engaging with toothed pinion 26 keyed to driving shaft 16, receive an advancing motion at a regular and continuous speed. This speed is equal to that of chain $C^1$. All of parts 1 to 4 thus move at the same speed and convey the fruit to be stoned towards the tools which are to carry out the stoning.

These tools are:

(1) A tool (Figs. 2 to 4) for loosening the stones.

(2) A tool (Figs. 5 to 7) for removing the stones.

1. The loosening tool comprises a sleeve 7 bored through and through, according to a large diameter, with a central hole 8, in which can slide parts 9 retained by pins 10 which, fastened to the sleeve 7, pass through parts 9 in slot 21 (Figs. 2 to 4). Parts 9 are pushed outward by compression springs 11 bearing upon shaft 12 on which the whole arrangement is mounted. This shaft 12 receives its rotary motion through pinion 13, chain 14, and pinion 15 keyed on to the driving shaft of the machine, which is controlled by a motor of any kind. Parts 9 penetrate into cavities $a$ of parts 1 to such an extent that their cutting portions 17 come into contact with the stone of the fruit to be stoned, cutting the pulp according to the shape of the cutting portions 17. As parts 1 and 4 are animated with a regular forward linear motion and parts 9 revolve with such a regular rotary motion and at such a speed that the chord of the arc described by parts 9 during their passage through cavities $a$ and $b$ of parts 1 and 4, it follows that the stone enclosed by the V of the cutting portions 17 of part 9 is alternately actuated with a restrained motion and an accelerated motion in relation to the fruit held in cavities $a$ and $b$ during the time of penetration of parts 9 which, in relation to parts 1 and 4, move with an irregular motion: slower than the speed of parts 1 and 4, at the moment when they enter cavity $a$, faster at the moment they are perpendicular to chains $C^1$ and $C^2$ in contact, once more slower at the moment when parts 9 leave parts 1 and 4. The result is that the stone thus moved becomes detached from the fruit pulp and is thus prepared for extraction from the fruit.

Springs 11 are intended to prevent parts 9 from breaking the stones by striking them too violently, as in such case springs 11 give way a little and parts 9 withdraw to the extent required.

After having been submitted to the action of the loosening tool, the fruit reaches the stone-removing tool. This tool (Figs. 5 to 7) is formed by a shaft 16 split at its end and provided with a part 18 set in slot 19 and retained by a bolt 20. Part 18 has at either end a tooth 21 with a cutting edge and curved at 90° with a rounded corner, its shape being adapted to that of the stone to be extracted. Teeth 21 are cut to the shape of a knife blade toward the front. This part 18 directed in a rotating motion by shaft 16 enters cavities a and b in parts 1 to 4 and emerges from them carrying with it the stone.

The peripherical speed of 18 is such that, as stated in connection with parts 9, the time taken to cover the arc described by 18, between the moment when that part 18 enters a and the moment when it leaves a, may be approximately equal to the time taken by chains $C^1$ and $C^2$ to travel over the same chord.

Part 18, carrying with it the stone, continues its rotation and having covered a certain angle (the measurement of which is of no importance), comes into contact with fixed part 22 (Figs. 8 to 10), cut in such manner that teeth 21 of part 18 may pass freely. At the same moment part 18 is met by part 23 (Figs. 11 to 13) fixed to shaft 24 by a slot and a bolt 25. This part 23 receives its rotary motion from shaft 16 through the medium of toothed pinions 26 and 27 and in such a manner that the speed of shaft 24 may be double than that of shaft 16, in order that part 23 may meet and go beyond the two toothed ends 18 in a complete revolution of 16. This part 23 is cut after the fashion of fixed part 22 and consequently passes between teeth 21 and part 18, carrying the stone with it when the latter has remained between the teeth of part 18. Owing to part 22 the stone can only be ejected downward along the curve of part 22, this in order to either prevent the stone from being thrown upward and taken up by teeth 21 of part 18, or to prevent the stone retained between teeth 21 of part 18 by a filament from being only raised without being extracted and ejected.

In order to prevent the stone from remaining between the slots of part 23, another part 28, permanently fixed by a screw 29, is placed tangentially to the motion of rotation of part 23 in such manner that the teeth of part 23 will pass between the teeth of part 28, thus removing all that may have remained between the teeth of part 23.

The progress of chains $C^1$ and $C^2$, as mentioned, carries with its parts 1 and 4 until the moment when chain $C^2$ is wound round pinion 6 and separates parts 4 from parts 1, which continue their movement towards pinion 3. Naturally, considering the size of cavity a, the fruit remains in that cavity when the stone has been removed. In order to detach the fruit from cavity a, some parts 31 are placed according to radius, and these penetrate into the cavities a, ejecting the fruit while closing those parts of the fruit that have opened to allow the stone to pass. As will be seen, these parts 31 are integral with pinion 3 in order to simplify the construction; but they could just as well be placed upon another shaft having a motion similar to that of shafts 12 and 16, but whose working part would then be part 31.

It is to be observed that the distance between the axes of cutting portions 17 of parts 9 is the same as that between the axes of teeth 21 of parts 18. Likewise the distance between the axes of the teeth of part 22 and of part 23, as also the distance between the axes of the teeth of part 28 are always equal to the forementioned distance. This is of course quite necessary and indispensable, since the sequence of operations of this machine requires:

(a) Insertion of teeth 21 in the part cut by cutting edges 17 of part 9.

(b) The passage of teeth 21 through part 22.

(c) The passage of the teeth of piece 23 between the teeth of part 18.

(d) The passage of the teeth of part 23 between the teeth of part 28.

Although the machine described has only one cavity for parts 1 and 4, the number of these cavities a and b can be just as well multiplied, if it be desired to increase the output of the machine. In such case it will suffice to proportion the number and shape of parts 9, 18, 22, 23 and 28 to the number of cavities. Thus a machine having ten cavities a will have twenty parts 9, ten parts 18. Parts 22, 23 and 28 will have ten sets of the same teeth as those described.

Likewise the distance between axes of two parts 1 and two parts 4 may be smaller and, for example, one-half of that considered in the specification. This would necessitate the use not of two symmetrical parts per revolution of shafts 12 and 16, but of four parts 9, two parts 18 and either two parts 23 or increase the speed of shaft 24 in the ratio of 1 to 2.

Likewise the machine described may also be designed and produced in a different plane, and it might, for example, be constructed in such a manner that instead of working and effecting the stoning according to the horizontal plane, the stoning might be carried out according to a vertical plane or any other, according to the convenience of the work.

The machine may be constructed so that the fruit holding portion may, for example, be an endless belt, one or more circular plates, one or more cylinders.

I claim:

1. In a fruit pitting machine a device for receiving and carrying the fruits to be pitted in a predetermined path, at least two pitting knives, each of said knives serving for detaching a pit from its fruit pulp, a rotatable shaft, said pitting knives being mounted to revolve about said shaft, another rotatable shaft, a rotary pitting fork mounted to revolve about said last mentioned shaft and adapted to remove said pit, said two shafts being arranged in spaced relation underneath and transversely of said fruit carrying device and being so positioned with respect to said fruit carrying device that the path of the ends of the knives as well as of the fork intersects the path of said fruit carrying device, and common driving means adapted to move said fruit carrying device and to rotate said shafts.

2. In a fruit pitting machine, a conveyer for receiving and carrying the fruits to be pitted, driving means for moving said conveyer with a continuous predetermined speed over a predetermined path, at least two pitting knives, each serving for detaching a pit from its fruit pulp, a rotatable shaft, a sleeve mounted on said shaft, said pitting knives radiating from said sleeve, another rotatable shaft, a rotary pitting fork mounted to revolve around said last mentioned shaft and adapted to remove said pit, said shafts being arranged in spaced relation beneath and transversely of said conveyer and being so positioned with respect to said conveyer that the path of the ends of the knives as well as of the fork intersects the path of said conveyer, said driving means being further adapted to rotate said two shafts.

3. In a fruit pitting machine a conveyer for receiving and carrying the fruits to be pitted in a predetermined path, said conveyer comprising two wheels carrying a chain, said chain being provided with receptacles comprising a hole in its lower face, at least two pitting knives, each serving for detaching a pit from its fruit pulp, a rotatable shaft, a sleeve mounted on said shaft, said pitting knives radiating from said sleeve, another rotatable shaft, a rotary pitting fork mounted to revolve around said latter shaft and adapted to remove said pit, said shafts being arranged in spaced relation below the path of movement of said conveyer and between said two wheels, and being so positioned with respect to said conveyer that the path of the ends of the knives as well as of the fork intersects the path of said conveyer, one of said two wheels over which said pitless fruits are moved being provided with pins in spaced relation, said pins being adapted to engage said hole in the lower face of the receptacles for ejecting the fruits, and common driving means adapted to continuously rotate at least one of said wheels, and to rotate said two shafts.

4. In a fruit pitting machine a pitting tool for detaching the pit from the fruit pulp, said tool comprising a sleeve mounted on a rotatable shaft, said sleeve being provided with a hole transversal to said shaft, at least two cutting members, each of said cutting members being provided at one end with a cutting knife adapted to engage a stone of the fruit to be pitted, each of said two cutting members being provided with a longitudinal slot and being slidably mounted in the transversal holes in said sleeve, pins in said sleeve passing through the slots in said cutting members to retain said cutting members, and resilient means bearing against said shaft and against each of said cutting members.

ROBERT ALFRED HENRI PAUL CHAPELLE.